US012756460B1

(12) United States Patent
Notch et al.

(10) Patent No.: US 12,756,460 B1
(45) Date of Patent: Oct. 6, 2026

(54) CLOUD-BASED ROGUE NETWORK DEVICE DETECTION

(71) Applicant: Calix, Inc., San Jose, CA (US)

(72) Inventors: Scott Notch, Hanover, MN (US); Marta Seda, Pleasanton, CA (US); Dylan Ethen, Maple Grove, MN (US); Scott Moen, Plymouth, MN (US); Christopher T. Bernard, Minneapolis, MN (US)

(73) Assignee: Calix, Inc., San Jose, CA (US)

( * ) Notice: Subject to any disclaimer, the term of this patent is extended or adjusted under 35 U.S.C. 154(b) by 135 days.

(21) Appl. No.: 18/830,201

(22) Filed: Sep. 10, 2024

(51) Int. Cl.
*H04B 10/00* (2013.01)
*H04B 10/079* (2013.01)
*H04Q 11/00* (2006.01)
*H04J 14/00* (2006.01)

(52) U.S. Cl.
CPC ..... *H04B 10/0793* (2013.01); *H04Q 11/0067* (2013.01); *H04Q 2011/0083* (2013.01)

(58) Field of Classification Search
CPC ................ H04B 10/07; H04B 10/0779; H04B 10/0793; H04B 10/0799
See application file for complete search history.

(56) References Cited

U.S. PATENT DOCUMENTS

2007/0143645 A1 6/2007 Haran
2009/0052891 A1 2/2009 Delew et al.
2010/0074614 A1 3/2010 Delew et al.
2014/0328264 A1 11/2014 Merlin et al.
2017/0272963 A1 9/2017 Rengarajan et al.
2018/0205749 A1 7/2018 Nandha Premnath et al.
2018/0288767 A1 10/2018 Hahn
2019/0132741 A1 5/2019 Stone et al.
2020/0275517 A1 8/2020 Ashrafi
2021/0014689 A1 1/2021 Wang
2021/0111815 A1 4/2021 Dion et al.
2021/0203521 A1 7/2021 Konda et al.
2021/0226714 A1 7/2021 Ye et al.
2023/0247508 A1 8/2023 Roberts et al.
2024/0129324 A1 4/2024 Thimmareddy et al.
(Continued)

FOREIGN PATENT DOCUMENTS

EP 3247157 A1 11/2017
WO 2016011918 A1 1/2016

OTHER PUBLICATIONS

Office Action from U.S. Appl. No. 18/830,284 dated Nov. 20, 2025, 13 pp.
(Continued)

*Primary Examiner* — Daniel G Dobson
(74) *Attorney, Agent, or Firm* — Shumaker & Sieffert, P.A.

(57) ABSTRACT

A system includes one or more memories, and model generation circuitry coupled to the one or more memories, wherein the model generation circuitry is configured to: determine a plurality of decision trees, wherein each decision tree is associated with a corresponding network whose attribute data, including interface statistics, is used for training a trained model and includes one or more decision nodes for indicating whether the corresponding network includes a rogue network device; aggregate the plurality of decision trees to generate the trained model; and output the trained model for rogue network device detection.

20 Claims, 6 Drawing Sheets

(56) References Cited

U.S. PATENT DOCUMENTS

| | | | | |
|---|---|---|---|---|
| 2024/0196119 | A1 * | 6/2024 | Kim | H04Q 11/0067 |
| 2024/0334193 | A1 | 10/2024 | Muhammad et al. | |
| 2024/0373264 | A1 | 11/2024 | Lovison et al. | |
| 2025/0007934 | A1 * | 1/2025 | Elhelo | H04L 63/20 |
| 2025/0023714 | A1 | 1/2025 | Kumar | |
| 2025/0048106 | A1 * | 2/2025 | Perez Martinez | H04W 12/122 |

OTHER PUBLICATIONS

ITU-T G.983.2, "Series G: Transmission Systems and Media, Digital Systems and Networks—ONT management and control interface specification for B-PON," The International Telecommunications Union, Jul. 2005, 370 pp.

ITU-T G.984.1, "Series G: Transmission Systems and Media, Digital Systems and Networks—Gigabit-capable passive optical networks (GPON): General characteristics," The International Telecommunications Union, Mar. 2008, 43 pp.

ITU-T G.987.3, "Series G: Transmission Systems and Media, Digital Systems and Networks—10-Gigabit-capable passive optical networks (XG-PON): Transmission convergence (TC) layer specification," The International Telecommunications Union, Jan. 2014, 146 pp.

ITU-T G.989.3, "Series G: Transmission Systems and Media, Digital Systems and Networks—40-Gigabit-capable passive optical networks (NG-PON2): Transmission convergence layer specification," The International Telecommunications Union, May 2021, 280 pp.

U.S. Appl. No. 18/830,284, filed Sep. 10, 2024, by Notch et al.

Final Office Action from U.S. Appl. No. 18/830,284 dated Apr. 7, 2026, 14 pp.

Response to Office Action dated Nov. 20, 2025 from U.S. Appl. No. 18/830,284, filed Feb. 13, 2026, 11 pp.

* cited by examiner

CLOUD-BASED ROGUE NETWORK DEVICE DETECTION

TECHNICAL FIELD

This disclosure relates to networking, and more particularly, communication between an optical network device and an optical line terminal (OLT) in an optical network.

BACKGROUND

Network devices permit a subscriber to access a variety of information via a network. A passive optical network (PON), for example, can deliver voice, video and data among multiple network nodes, using a common optical fiber link. Passive optical splitters and combiners enable multiple network devices such as optical network units (ONUs), also referred to as optical network terminals (ONTs), to share the optical fiber link. Each network device terminates the optical fiber link for a residential or business subscriber, and is sometimes referred to as a subscriber premises node that delivers Fiber to the Premises (FTTP) services.

In some systems, a network device is connected with wiring to one or more subscriber devices in the subscriber premises, such as televisions, set-top boxes, telephones, computers, or network appliances, which ultimately receive the voice, video and data delivered via the PON. In this manner, the network device can support delivery of telephone, television and Internet services to subscriber devices in the subscriber premises.

DETAILED DESCRIPTION

Figure 1:
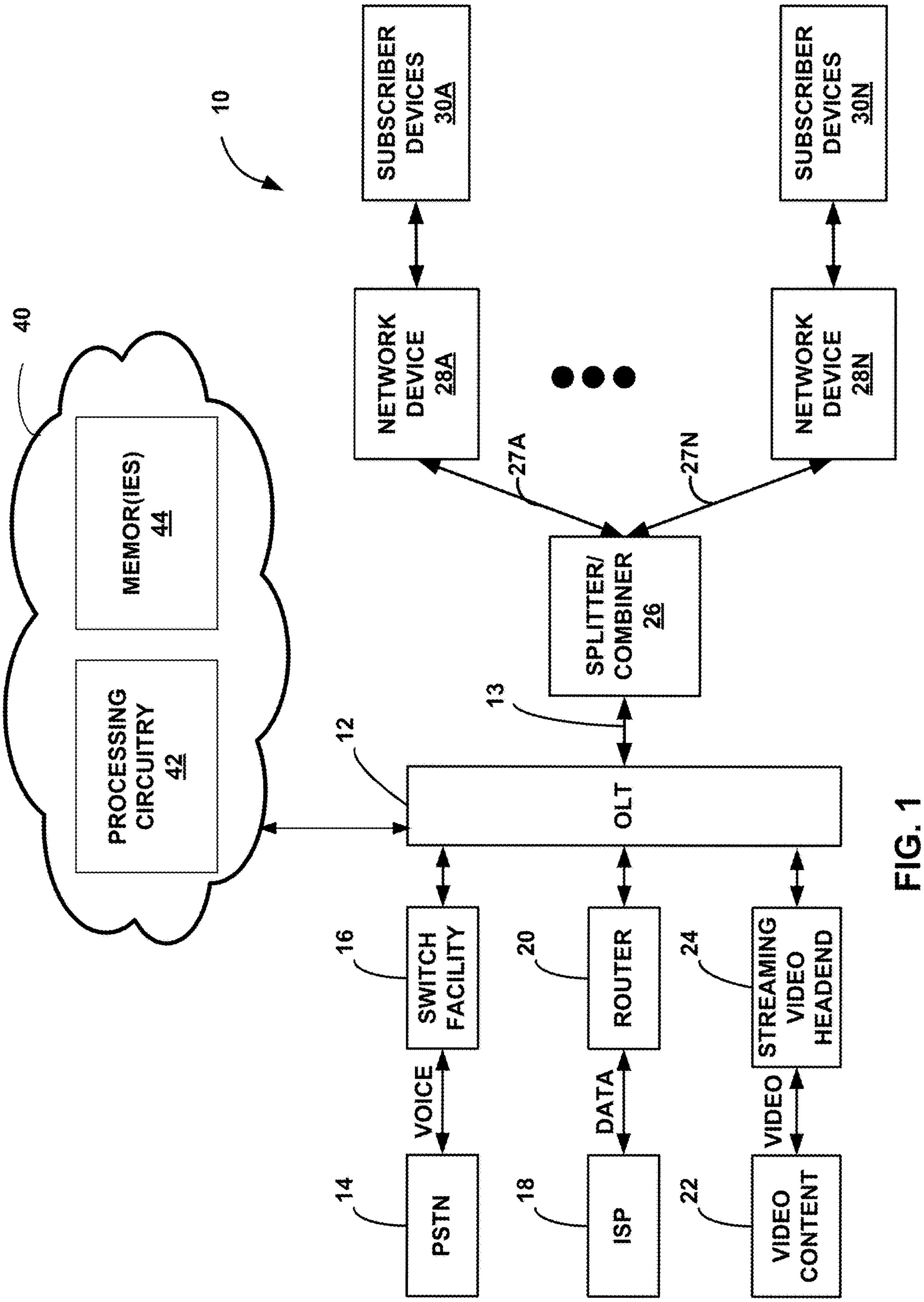
FIG. 1 is a block diagram illustrating a network, in accordance with one or more aspects of this disclosure.

This disclosure describes example techniques to aggregate attribute data that is used for rogue network device detection to generate and utilize a trained model detecting a rogue network device in any variety of different networks and network types. For a given network, a cloud computing environment that includes processing circuitry may be configured to utilize the trained model to determine whether the network includes a rogue network device.

A rogue network device may be considered as a network device that is operating in an unintended manner. For example, a passive optical network (PON) includes an optical line terminal (OLT) and one or more optical network units (ONUs), also called optical network terminals (ONTs). The OLT and the ONUs are examples of network devices. In the PON, each ONU is to transmit optical signals having an optical power within a range, at a provisioned timeslot within a spectral allocation. A rogue network device may be a network device that fails to transmit or transmits optical signals having optical power that is out of range, that transmits optical signals outside of a provisioned timeslot, or that transmits optical signals outside of a spectral allocation, as a few examples of a rogue network device, and other examples are possible.

A rogue network device may itself be operating in an unintended manner, but can further impact the operability of the network. For instance, if a network device is transmitting optical signals outside of its provisioned timeslot and/or outside of its spectral allocation, then such optical signals may interfere (e.g., collide) with optical signals from other network devices. In some examples, rogue network device detection can be complicated and unreliable. For instance, the presence of a rogue network device results in the inability of the OLT to reconstruct the bitstream of the optical signals, which causes errors. However, it may be unclear whether the errors are due to a rogue network device, or due to some other cause.

Accordingly, fast and reliable identification of a rogue network device in a network may be important to ensure network stability. This disclosure describes cloud-based rogue network device identification in a network. That is, with the example techniques described in this disclosure, processing circuitry in a cloud computing environment may be configured to identify whether a rogue network device is present in the network, and output information indicative of whether the rogue network device is present in the network.

In one or more examples, the processing circuitry in the cloud computing environment may be configured to execute a trained model, such as an ensemble-based machine learning (ML) model (e.g., random forest based trained model). For purposes of description only, the techniques are described with respect to an ensemble-based machine ML model, such as a random forest based trained model, but the techniques are not so limited. Example techniques for generating the trained model are described in more detail.

The trained model may receive as input attribute data of a network for which a determination is being made of whether a rogue network device is present or not. The attribute data may include interface statistics between the plurality of network devices in the network. The interface statistics may refer to information of the communication links formed by the network devices. Examples of the interface statistics include one or more of information indicative of a number of misses, bit error rate variability, and error correction failure, described in more detail further below. The attribute data, in addition to the interface statistics, may include one or more of network technology, splitter topology, and number of network devices. Additional examples of the attribute data may be temperature, humidity, power grid fluctuations, etc. Other types of attribute data may include software attributes such as device up time, software version, etc. of software executing on the network devices.

In one or more examples, the attribute data may be data that the processing circuitry can use to generate a digital twin of the network. A digital twin refers to a digital representation of the actual network. The digital twin may provide a way in which to analyze the actual network.

Using the attribute data as input, the trained model may be configured to predict whether a rogue network device is present in the network. For instance, for a random forest trained model, the attribute data may function as inputs to the various decision trees that aggregate together to form the random forest trained model. The decision trees may output a prediction of whether there is a rogue network device, and use some form of voting from the outputs of the decision trees to identify whether there is a rogue network device in the network.

In one or more example, model generation circuitry may be configured to generate the trained model. The model generation circuitry may be the same as the processing circuitry in the cloud computing environment, or may be some other processing circuitry.

The following describes example ways in which to generate the trained model, such as using random forest model techniques, which is an example of an ensemble-based models. However, the example techniques are extendable to other ensemble-based models. In general, ensemble-based models refer to machine learning techniques that involve combining multiple models to improve the overall performance and robustness compared to using a single model. Examples of ensemble-based models include bagging (e.g., training multiple instances of the same model), boosting (e.g., sequentially training models where each subsequent model corrects errors of the predecessor), stacking (e.g., combining prediction of multiple models as inputs to a higher-level model), and voting (e.g., combining prediction from models of different types and voting to determine a prediction). Furthermore, the example techniques may be applicable to non-ensemble-based models as well, and may utilize various other types of the machine learning and/or artificial intelligence techniques.

There may be many networks in operation, and attribute data from these networks can be used as training data. For instance, through manual testing or some other technique, a network operator may determine that a first network includes a rogue network device. The attribute data from this first network (e.g., first attribute data) may function as training data. Through manual testing or some other technique, a network operator may determine that a second network includes a rogue network device. The attribute data from this second network (e.g., second attribute data) may function as training data, and so forth.

The model generation circuitry may utilize the attribute data to form multiple different decision trees. Each of the decision trees may include decision nodes (e.g., points where the decision tree branches), and is generally an affirmative or negative determination (e.g., decision node is true or false), but the techniques are not so limited. Each of the decision trees may be for indicating whether a network includes a rogue network device. Stated another way, the model generation circuitry may determine a plurality of decision trees. Each decision tree may be associated with a corresponding network and includes one or more decision nodes for indicating whether the corresponding network includes a rogue network device.

The model generation circuitry may aggregate the plurality of decision trees to generate a trained model. For instance, during the training phase, the model generation circuitry may build the decision trees to a certain depth or until no further branches are needed to improve rogue network device determination for the corresponding network. The model generation circuitry may then connect together the decision trees to generate the trained model.

In some techniques, generating a trained model using random forest techniques may include bootstrapped sampling and/or feature randomness for generating the decision trees. In one or more examples, the model generation circuitry may perform similar operations for generating the decision trees. However, in some cases, because there are many networks in operation each with a decision tree, there may be sufficient diversity in the decision trees that bootstrapped sampling and/or feature randomness may not be needed, or the need for such operations in the training phase may be reduced but still present. It may not be necessary for there to be a decision tree for every single network, but of the networks for which a decision tree is available, there may be sufficient diversity to generate the trained model.

The model generation circuitry may output the trained model for rogue network device detection. For example, the processing circuitry in the cloud computing environment may be configured to execute the trained model, and input in the attribute data of a particular network to identify whether that particular network includes a rogue network device.

In one or more examples, the model generation circuitry may update the trained model based on additional feedback. For example, there may be instances where the processing circuitry executes the trained model, but generates false positives (e.g., determines that a rogue network device is present in the network when there is no such rogue network device) or false negatives (e.g., determines that a rogue network device is not present in the network when there is such a rogue network device). In one or more examples, the model generation circuitry may receive information of such false positives or false negatives, and update the trained model. That is, the model generation circuitry may iterate on the trained model as new information becomes available from in-field use to generate a trained model that is more accurately determines whether a rogue network device is present in the network.

FIG. 1 is a block diagram illustrating a network 10. For purposes of illustration, the example implementations described in this disclosure are described in context of an optical network (e.g., a passive optical network (PON)). Accordingly, network 10 may be referred to as PON 10. However, aspects of this disclosure are not so limited, and can be extended to other types of networks such as cable or digital subscriber line (DSL) based networks, or Ethernet Optics which may be considered as optical transmission and reception in accordance with the Ethernet protocol. Ethernet optics are defined more generally by IEEE 802.3. Examples of network 10 also include shared-medium transports such as WiFi, IEEE 802.11, and RF/DOCSIS, or other wireless communication techniques.

As shown in FIG. 1, PON 10 may deliver voice, data and video content (generally "information") to a number of network nodes via optical fiber links. In some examples, PON 10 may be arranged to deliver Internet Protocol television (IPTV) and other high speed information (e.g., information transmitted at approximately 200 Mbps or higher). PON 10 may conform to any of a variety of PON standards, such as the broadband PON (BPON) standard (ITU G.983), Ethernet PON (EPON), the gigabit-capable PON (GPON) standard (ITU G.984), or 10 giga-bit NGPON, 50G/High Speed PON, as well as future PON standards under development by the Full Service Access Network (FSAN) Group, such as 10G GPON (ITU G.987), or other organizations.

Figure 2:
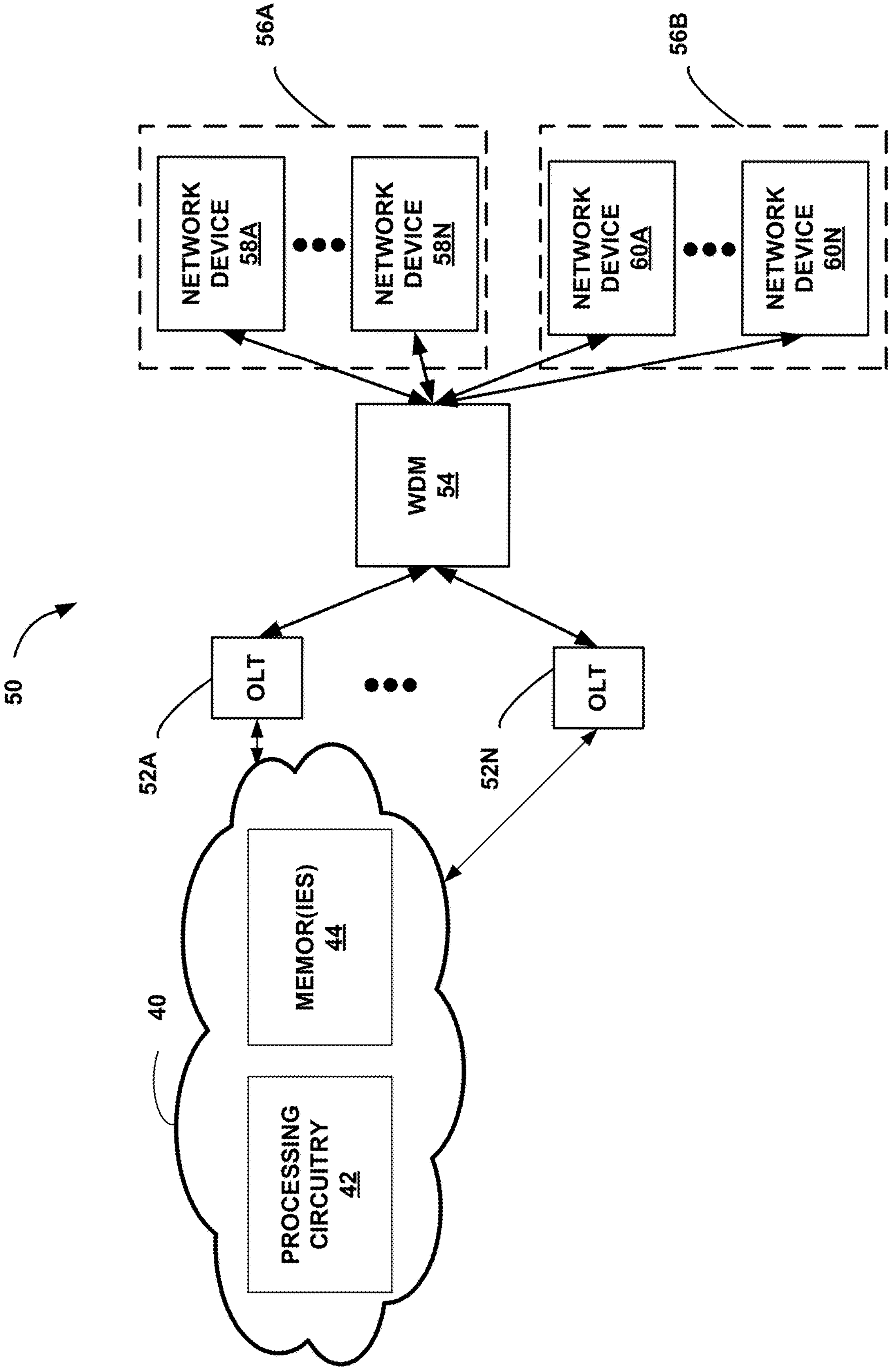
FIG. 2 is a block diagram illustrating another network, in accordance with one or more aspects of this disclosure.
Figure 4:
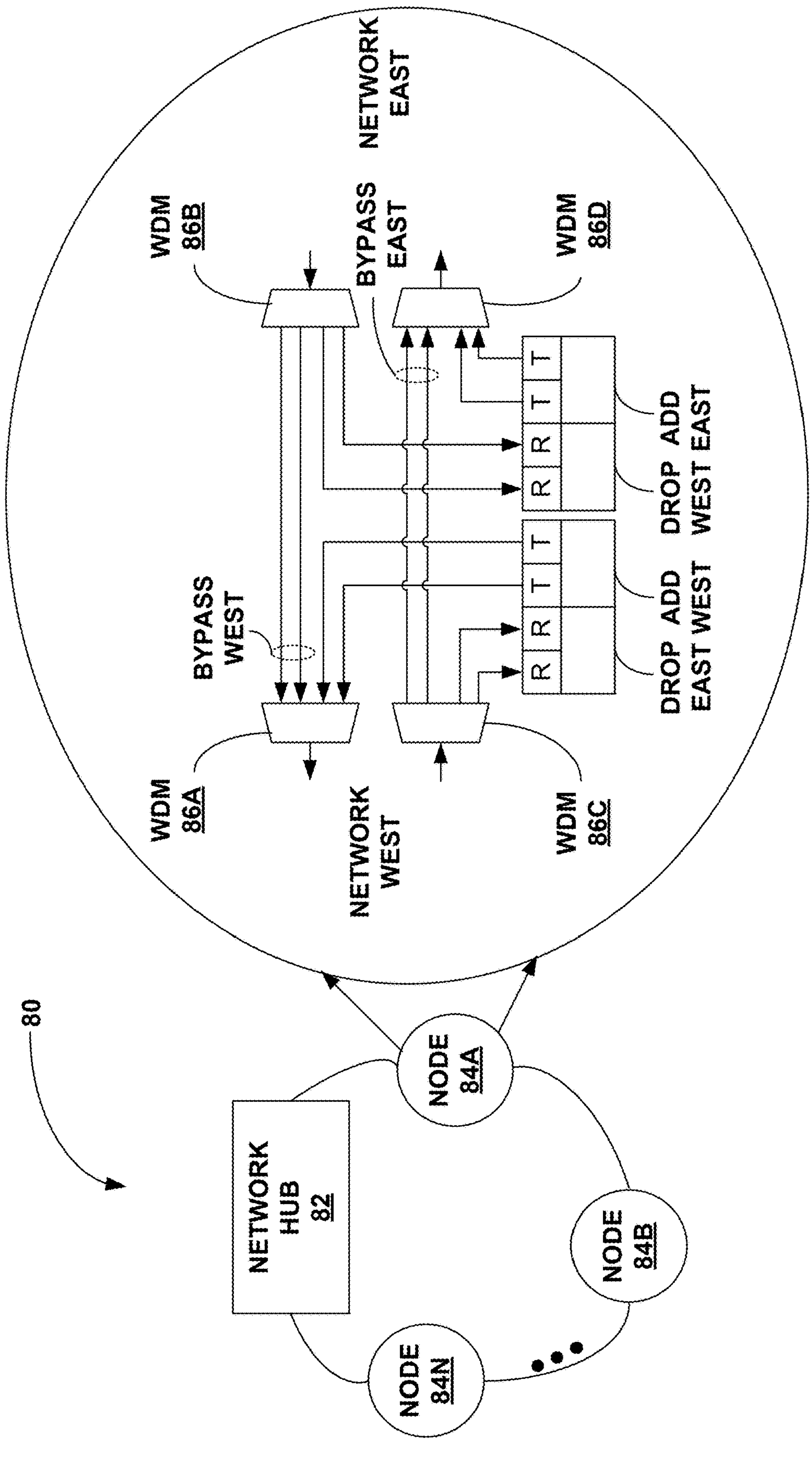
FIG. 4 is a block diagram illustrating another example network, in accordance with one or more aspects of this disclosure.

In general, there are multiple forms of point to multi-point passive optical access networks. Some examples include time division multiplexing (TDM PON), wavelength division multiplexing (WDM PON), and time and wavelength division multiplexing (TWDM PON). FIG. 1 illustrates examples of a TDM PON. FIG. 2, described below, is an example of a WDM PON or TWDM PON. FIG. 4, described below, is an example of a transport network including dense WDM (DWDM), such as a ring network, spline network, or mesh network, as few examples.

Optical line terminal (OLT) 12 may receive voice information, for example, from the public switched telephone network (PSTN) 14 via a switch facility 16. In addition, OLT 12 may be coupled to one or more Internet service providers (ISPs) 18 via the Internet and a router 20. As further shown in FIG. 1, OLT 12 may receive video content 22 from video content suppliers via a streaming video headend 24. Video also may be provided as packet video over the Internet. In each case, OLT 12 receives the information, and distributes it along optical fiber link 13 to optical splitter/combiner 26.

Optical splitter/combiner 26 then distributes the information to network devices 28A-28N (collectively referred to as "network devices 28") via respective fiber optic links 27A-27N (collectively referred to as "fiber optic links 27"). In some examples, PON 10 includes 128 network devices 28; however, the aspects of this disclosure are not so limited.

Network devices 28 may be referred to as optical network units (ONUs) or optical network terminals (ONTs). Other examples of network devices 28 include, but are not limited to, cable modems, DSL modems, or wireless devices. However, for purposes of illustration but without limitation, the example implementations described in the disclosure are described in the context of the network devices 28 being an ONU or ONT. Also, OLT 12 may be considered as another example of a network device.

That is, the term network device is used to generally refer to components in a network, such as PON 10, that communicate with each other. For description purposes, the functionality of OLT 12 is described separately from network devices 28, which may be ONTs or ONUs in PON 10.

Each one of network devices 28 may reside at or near a subscriber premises that includes one or more subscriber devices 30A-30N (collectively referred to as "subscriber devices 30"). For instance, network device 28A resides at or near a subscriber premises that includes one or more subscriber devices 30A, and network device 28N resides at or near a subscriber premises that includes one or more subscriber devices 30N. The subscriber premises may be a home, a business, a school, or the like. A single network device 28 may be capable of transmitting information to and receiving information from one or more subscriber premises.

As illustrated, a single network device 28 may directly transmit information to or receive information from one or more subscriber devices 30 within the subscriber premises. Examples of the subscriber devices 30 include, but are not limited to, one or more computers (e.g., laptop and desktop computers), network appliances, televisions, game consoles, set-top boxes, wireless devices, media players or the like, for video and data services, and one or more telephones for voice services. Subscriber devices 30 may also include household appliances such as furnaces, washer and dryers, freezers, refrigerators, thermostats, lights, security systems, and the like.

OLT 12 transmits downstream information to and receives upstream information from network devices 28 via fiber link 13 coupled to splitter/combiner 26. Downstream information may be considered to be information transmitted by OLT 12 and received by network devices 28. Upstream information may be considered to be information transmitted by each one of network devices 28 and received by OLT 12. As illustrated in FIG. 1, optical splitter/combiner 26 may be coupled to each one of network devices 28 via respective optical fiber links 27.

In some examples, optical splitter/combiner 26 may be a passive splitter/combiner. A passive splitter/combiner may not need to be powered. For downstream transmission, including voice, video, and data information from OLT 12, optical splitter/combiner 26 receives the downstream information and splits the downstream information for downstream transmission to network devices 28 via respective fiber links 27. For upstream information, including voice and data information from each one of network devices 28, optical splitter/combiner 26 receives upstream information from network devices 28 via respective fiber links 27 and combines the upstream information for transmission to OLT 12.

In some examples, optical splitter/combiner 26 may not be a passive splitter/combiner, but rather an active splitter/combiner. In these examples, optical splitter/combiner 26 may be powered locally. In these examples, optical splitter/combiner 26 may function as a switch, router, multiplexer, and the like.

Network devices 28 receive and transmit information via respective fiber links 27. Also, OLT 12 receives and transmits information via fiber link 13. To differentiate between transmission and reception, each one of network devices 28 may be configured to transmit voice and data information with an optical signal with a wavelength of 1310 nanometer (nm), receive voice and data information with an optical signal with a wavelength of 1490 nm, and receive video information with an optical signal with a wavelength of 1550 nm. OLT 12 may be configured to receive voice and data information with an optical signal with a wavelength of 1310 nm, transmit voice and data information with an optical signal with a wavelength of 1490 nm, and transmit video information with an optical signal with a wavelength of 1550 nm. These wavelengths are provided merely as examples, and the wavelength possibilities are not so limited.

The specific transmit and receive wavelengths indicated above are provided for illustration purposes only. In different examples, network devices 28 and OLT 12 may be configured to transmit and receive information with optical signals at different wavelengths than those provided above. Also, the wavelengths described above may be applicable for TDM PON, and may be different for WDM PON or TWDM PON.

Each one of network devices 28 may be configured to transmit upstream information according to time division multiple access (TDMA) techniques. For instance, OLT 12 may provision (e.g., grant or assign) to each of subscriber devices 30 certain timeslots during which to transmit upstream information. Each one of network devices 28 transmits information to OLT 12 based on the provisioned timeslots assigned to each of respective subscriber devices 30. The timeslot for each one network devices 28 may be different. In this manner, each one of network devices 28 may transmit information without collision of information from two or more different network devices 28 at splitter/combiner 26. Collision of information may occur if splitter/combiner 26 receives upstream information from two or more network devices 28 at the same time.

As one example of the TDMA techniques, when one of network devices 28 (e.g., network device 28A), is powered on for the first time, OLT 12 may perform an auto-ranging process, as is well known in the art. For instance, during the auto-ranging process, OLT 12 may calculate the total propagation delay (e.g., the total time it takes to transmit information to network device 28A and receive information from network device 28A). OLT 12 may perform similar auto-ranging process on each one of network devices 28.

After the auto-ranging process, OLT 12 may calculate an equalization delay for each one of network devices 28, utilizing techniques well known in the art. The equalization delay equalizes the propagation delay of each one of network devices 28, relative to the other network devices 28. OLT 12 may transmit the equalization delay to each one of network devices 28 utilizing a physical layer operations and maintenance (PLOAM) message.

Once all the equalization delays are calculated and transmitted to network devices 28, OLT 12 may provision the timeslots during which each one of network devices 28 should transmit data (e.g., an optical signal). OLT 12 may transmit a bandwidth map to each one of network devices 28 indicating the timeslots during which each one network devices 28 should transmit data. OLT 12 may transmit the bandwidth map utilizing a PLOAM message, or other messages. In this way, PON 10 utilizes time division multiplexing to precisely synchronize transmission from all ONTs (e.g., network devices 28) such that each ONT transmits during a window where all other ONTs are quiet.

Stated another way, for TDM, the downstream and upstream transmissions between OLT 12 and network devices 28 are multiplexed in the time domain. For ITU PON systems, the downstream direction is a broadcast transmission where individual information for each of network devices 28 is multiplexed in the time domain. For the upstream direction, OLT 12 provisions each of network devices 28 with a timeslot in which to transmit its upstream information to OLT 12. During this window it is expected that all other network devices 28 that communicate with the same OLT 12 port turn-off transmission to create a silent window. Such a TDM architecture is deployed for ITU GPON, XGS-PON and G.Hsp PON, as a few examples of PON 10.

However, because PON 10 is a shared medium for network devices 28, PON 10 may be susceptible to network outages due to a single misbehaved (e.g., malfunctioning) network device 28. For example, although each one of network devices 28 should output an optical signal representing the data received from subscriber devices 30 during its provisioned timeslot, a malfunctioning network device 28 may fail to transmit or transmit optical signals having optical power that is out of range, transmit optical signals outside of a provisioned timeslot, or transmit optical signals outside of a spectral allocation (e.g., outside of the assigned wavelength).

For instance, each one of network devices 28 includes a controller, such as a media access control (MAC) controller, that instructs a laser driver to turn on the laser (e.g., energize the laser) during its provisioned timeslot and to turn off the laser (e.g., de-energize the laser) during timeslots to which it is not assigned. In the techniques described in this disclosure, one of network devices 28 that malfunctions, such as operating outside the control of its controller or where the controller is operating improperly or was configured improperly, is referred to as a rogue network device.

Stated another way, in PON 10, it is undesirable for optical signals to be present at wavelength (e.g., frequency domain) or at a timeslot (e.g., time domain) when not expected. It may also be undesirable for a case where optical signals are expected at a wavelength or timeslot, but not present, or where the optical power of the optical signals is out of range. In PON 10, if one or more of the above example conditions (e.g., optical signals at unexpected wavelengths or timeslots, failure of optical signals to be present or power is out of range) are true, there may be a rogue network device present in PON 10. There may be other conditions for one of network devices 28 being identified as a rogue network device, and the above conditions are merely used for example purposes.

Rogue network devices are undesirable for system operators due to the severe implications on the network (e.g., PON 10). That is, the existence of a rogue network device in PON 10 may be a significant failure mode of PON 10. For example, the optical signal transmission from the rogue network device falls outside the allowed timeslots and is sent coincidently with the proper transmission from other ones of network devices 28. For example, network device 28A may be provisioned a first timeslot in which to transmit an optical signal, and network device 28N may be provisioned a second timeslot in which to transmit an optical signal. If network device 28A were a rogue network device, network device 28A may transmit an optical signal during the first timeslot, which will be data from subscriber devices 30A. In addition, network device 28A may transmit an optical signal during the second timeslot which coincides, and hence collides, with the optical signal of network device 28N, which will be data from subscriber devices 30N.

In this case, the optical signal outputted by network device 28A during the second timeslot (e.g., the timeslot to which network device 28A is not assigned) may be a noisy optical signal with random optical ones and zeros and not at a fixed data rate. This noisy optical signal from network device 28A mixes with optical signal from network device 28N in the second timeslot resulting in the inability of OLT 12 to properly reconstruct the data transmitted by subscriber devices 30N via network device 28N in the second timeslot (e.g., causing recovery issues at OLT 12). For example, there may be a significant number of bit-errors in the reconstructed data transmitted by subscriber devices 30N via network device 28N in the second timeslot.

The above is one example of network device 28A being a rogue network device. As another example, network device 28A may fail to transmit or transmit optical signals having optical power that is out of range. As another example, network device 28A may transmit optical signals outside of a spectral allocation, and may interfere with optical signals from network device 28N if the spectral allocation at which network device 28A is transmitting overlaps with the spectral allocation of network device 28N. Rogue behavior due to transmitting outside of spectral allocation may be present in WDM systems described below with respect to FIG. 2.

The following describes scenarios where there is a rouge network device in the network, and issues that may be present for purposes of illustration. In general, the presence of a rogue network device increases the bit error rate (BER) (i.e., a ratio of the number of erroneous bits in a portion of the bitstream to the total number of bits in the portion of the bitstream). In a best-case scenario, error correction techniques, such as forward error correction (FEC) techniques, are able to correct for the erroneous bits. However, in a worst-case scenario, the BER increases to such a level that error correction techniques are unable to correct the erroneous bits or the cause of the increase in the BER is such that error correction techniques are unable to correct the erroneous bits, the stability of the network may be severely impacted to a point where services are interrupted for subscriber devices 30. For instance, error correction techniques may be based on an assumption that the errors are random in nature. However, with a rogue network device, the errors may not be random, but instead deterministic.

Error correction techniques may not function at full capability in correcting for such errors.

Rogue transmissions are not unique to PON networks. Wavelength division multiplexing (WDM) is a common networking architecture, such as in FIG. 4. Implications are similar in nature to PON impacts, larger levels of impacts can be observed as entire line cards, rings, or access networks will see impacts. For instance, rogue detection for WDM, such as in transport networks like ring networks, spline networks, or mesh networks is described with respect to FIG. 4.

As described above, one example of a rogue network device is a network device that does not transmit during a provisioned timeslot or transmits optical signals having optical power that is out of range. This may be due to the laser of the rogue network device not turning on or the laser outputting optical power that is too high or too low (e.g., optical power that is out of range).

As a partial failure, the rogue network device transmission does not meet the minimum power transmission requirements, or the transmission exceeds the maximum power transmission requirements. As a complete failure, there is no transmission by the rogue network device in the provisioned (e.g., allocated or assigned) timeslot or spectral (e.g., wavelength) allocation.

As described above, another example of a rogue network device is a network device that transmits optical signals outside of a provisioned timeslot. This may be due to the controller of the rogue network device operating incorrectly or the controller of the rogue network device operating as programmed, but was programmed incorrectly (e.g., provisioned an incorrect timeslot). Another cause for such rogue behavior may be due to the failure of the controller to turn of the laser of the rogue network device.

As a partial failure, the laser of the rogue network device turns on or off outside of the time allocation window (e.g., outside of a provisioned timeslot), interrupting the prior or next transmission window. In the partial failure, the transmission is still well formed in duration. That is, in some examples, in a partial failure, the transmission of the rogue network device is offset from its provisioned timeslot such that some of the transmission is outside of the provisioned timeslot, but other parts of the transmission are within the timeslot. In such a partial failure, the rogue network device may be silent except during the timeslot when the rogue network device transmits. It is that the timeslot when the rogue network device transmits is not within the provisioned timeslot. In such cases, the optical signal of the rogue network device may interfere with the optical signals from a few, but not necessarily, all other network devices.

As a complete failure, the transmission from the rogue network device may be outside of the provisioned timeslot and may not be well formed in duration. For example, in a complete failure, the laser of the rogue network device may not turn off. In such cases, during timeslots at which the rogue network device is not provisioned, the rogue network device may keep outputting an optical signal that is effectively noise. In such cases, the optical signal of the rogue network device may interfere with the optical signals from all other network devices.

As described above, another example of a rogue network device is a network device that transmits optical signals outside of a spectral allocation (e.g., outside of an assigned wavelength). As a partial failure, transmission wavelength excursions (e.g., optical signals outside of spectral allocation) outside the intended channel (e.g., wavelength) bounds during the time frame of a single transmission. This is sometimes known as short term spectral excursion. Most of the transmission is within the designated spectral window (e.g., within the spectral allocation), but portions, commonly at the start or end of a transmission, exceed the spectral window. As another partial failure, the wavelength of the optical signal wanders slowly outside the spectral channel window (e.g., outside the spectral allocation), over the period of many transmissions.

As a complete failure, the wavelength of the optical signal is stable outside the desired channel window. That is, the wavelength of the optical signal transmitted by the rogue network device does not deviate or drift; however, the wavelength at which the rogue network device is transmitting the optical signal is outside the spectral allocation. As another complete failure, the wavelength of the optical signal is unstable and wanders in time through many channels. That is, the wavelength of the optical signal transmitted by the rogue network device continuously drifts or wanders, resulting in many instances where the wavelength of the optical signal is outside of the spectral allocation.

FIG. 2 is a block diagram illustrating another network, in accordance with one or more aspects of this disclosure. For example, FIG. 2 illustrates a multiple wavelength network 50 (e.g., WDM PON or TWDM PON). One example of network 50 is an ITU-T G.989 (NGPON-2) conforming system. Network 50 includes OLTs 52A-52N, which may each be similar to OLT 12 of FIG. 1. For ease of illustration, the various components that couple to OLTs 52 for voice, data, and video, illustrated in FIG. 1, are not illustrated in FIG. 2.

In network 50, each one of OLTs 52A-52N may transmit downstream optical signals and receive upstream optical signals at specific wavelengths that are different from one another. For example, OLT 52A transmits optical signals at a first downstream wavelength, and receives optical signals at a first upstream wavelength. OLT 52N transmits optical signals at a second downstream wavelength, and receives optical signals at a second upstream wavelength. Each of these downstream wavelengths is different than each of the other downstream wavelengths and each of the upstream wavelengths. Each of these upstream wavelengths is different than each of the other upstream wavelengths and each of the downstream wavelengths.

In some examples, OLTs 52A-52N may not all be the product of the same company. In some examples, OLTs 52A-52N may be located in different geographical locations. In some examples, OLTs 52A-52N may be located together within the same chassis or located together within proximity of one another. In some examples, rather than having multiple OLTs 52A-52N, network 50 may include one OLT with multiple transmitters and receivers where each transmitter is configured to transmit downstream optical signals at different downstream wavelengths, and each receiver is configured to receive upstream optical signals at different upstream wavelengths (where the downstream and upstream wavelengths are also different). For ease of description, the techniques are described with examples that include multiple OLTs (e.g., OLTs 52A-52N).

Each one of OLTs 52A-52N is associated with (e.g., assigned to) a set of network devices. For example, OLT 52A is associated with set of network devices 56A, and OLT 52N is associated with set of network devices 56B. Set of network devices 56A includes network devices 58A-58N, and set of network devices 56B includes network devices 60A-60N.

Network devices 58A-58N and 60A-60N may be similar to network devices 28 of FIG. 1. For ease of illustration and description, the subscriber devices that connect to respective network devices 58A-58N and 60A-60N are not illustrated in FIG. 2.

In some examples, the upstream and downstream capabilities of network devices 58A-58N and 60A-60N may be tunable. For instance, as described above, OLT 52A may be configured to transmit downstream optical signals with a first downstream wavelength and configured to receive upstream optical signals with a first upstream wavelength. In the example of FIG. 2, network devices 58 may be tuned to transmit optical signals at the first upstream wavelength and receive optical signals at the first downstream wavelength. Similarly, network devices 60 may be tuned to transmit optical signals at the second upstream wavelength at which OLT 52N is configured to receive optical signals, and tuned to receive optical signals at the second downstream wavelength at which OLT 52N is configured to transmit optical signals.

In some examples, network devices 58 and 60 may be tunable for distinct wavelengths. For instance, network devices 58 and 60 may be tunable to transmit upstream optical signals with wavelength X or with wavelength Y, and not wavelengths intermediate to X and Y, or wavelengths other than X or Y In this example, OLT 52A may be configured to receive upstream optical signals with wavelength X, and OLT 52N may be configured to receive upstream optical signals with wavelength Y The same may be true for the tuning for the reception of downstream optical signals.

As illustrated, network 50 includes wavelength division multiplexer (WDM) 54. In the downstream, WDM 54 receives downstream optical signals at respective wavelengths from OLTs 52A-52N, and filters the downstream optical signals so that network devices 58 only receive the downstream optical signals with the first downstream wavelength, and so that network devices 60 only receive the downstream optical signals with the second downstream wavelength. In the upstream, WDM 54 receives upstream optical signals at respective wavelengths from network devices 58 and network devices 60, and filters the upstream optical signals so that OLT 52A only receives the optical signals with first upstream wavelength, and so that OLT 52N only receives the optical signals with the second upstream wavelength.

Although a single WDM 54 is illustrated in FIG. 2, in some examples there may be multiple WDMs located throughout network 50. As one example, a first WDM may couple to OLTs 52A-52N, and couple to a second WDM via a first fiber link and a third WDM via a second fiber link. The second WDM may be proximate to network devices 58, and the third WDM may be proximate to network devices 60. Other such configurations are possible to allow OLTs 52A-52N to communicate with network devices 58A-58N and 60A-60N.

In some examples, it may be possible for network device 58A to become rogue and to transmit upstream optical signals not at the first upstream wavelength, but at a different upstream wavelength (e.g., the second upstream wavelength). That is, network device 58A may transmit optical signals outside of the spectral allocation.

Accordingly, in FIG. 2, for wavelength division multiplexing, downstream and upstream transmissions are multiplexed in the wavelength domain. Each of network devices 58 and OLT 52A and network devices 60 and OLT 52N has its own dedicated spectral allocation (e.g., wavelength allocation) to communicate over. Network 50 may be configured as duplex or diplex. In duplex, downstream and upstream are on separate fibers. In diplex systems, downstream and upstream transmissions are transmitted on the same fiber. Wavelength division multiplexing tend to be available in reconfigurable optical add-drop multiplexer (ROADM) Metro networks and exist in the fiber access space as ITU NG-PON2, as noted above.

Time and wavelength division multiplexing (TWDM) combines the time division multiplexing of TDM PON and the wavelength division multiplexing of WDM systems. In some examples, network 50 may be as a TWDM PON. In TWDM PON, downstream and upstream are multiplexed in time and frequency. That is, there is both provisioned timeslots and spectral allocation for upstream transmissions of optical signals. Transmissions of the optical signals may be on fixed channels transmitting, as is the case for Multi-PON networks where ITU XGS-PON and GPON are both present, or have bandwidth allocations across time and frequency channels, as is the case for ITU NG-PON2 PON networks.

FIGS. 1 and 2 both illustrate cloud computing environment 40 that includes processing circuitry 42 and one or more memories 44. As described in more detail, processing circuitry 42 may be configured to identify whether a rogue network device is present in network 10 or network 50.

Cloud computing environment 40 may provide storage and computing power for analyzing network 10 and/or network 50. For instance, processing circuitry 42 and one or more memories 44 may be across one or more servers that form cloud computing environment 40. Examples of cloud computing environment 40 may include the CalixCloud® cloud computing environment, such as the Operations CalixCloud® cloud computing environment and the Support CalixCloud® cloud computing environment.

In accordance with one or more examples described in this disclosure, processing circuitry 42 may be configured to receive attribute data of network 10 or network 50. The attribute data may generally be data that qualitatively and/or quantitatively defines network 10 or network 50. As one example, the attribute data may be data that is sufficient for processing circuitry 42 to generate a "digital twin" of network 10 or network 50. A digital twin of network 10 or network 50 is a digital representation of the actual network 10 or network 50. The digital twin may provide a way in which to analyze the actual network. There are various known ways to generate a digital twin, and the example techniques are not limited to any particular manner in which a digital twin in generated. Moreover, generation of a digital twin is not needed in all examples.

One example of the attribute data includes interface statistics between a plurality of network devices in the network. Interface statistics may generally refer to information of communication links formed by network devices 28, 58, and 60 (e.g., with respective OLTs), examples of which are provided further below. The attribute data, in addition to the interface statistics, may include one or more of network technology of network 10 or 50 (e.g., GPON, XGS-PON and G.Hsp PON, TDM PON, WDM PON, TWDM PON), splitter topology (e.g., splitter/combiner 26 or WDM 54), and number of network devices (e.g., number of network devices 28, 58, or 60). Additional examples of the attribute data may be temperature, humidity, power grid fluctuations, etc. of network 10 or network 50.

In one or more examples, as illustrated in FIGS. 1 and 2, OLT 12, OLT 52A, and OLT 52N may be tasked with gathering the interface statistics, and transmitting the interface statistics to cloud computing environment 40. As one example, OLT 12 and OLT 52A-52N may be configured to continuously gather interface statistics, and then periodically (e.g., every 15 minutes) transmit the interface statistics to cloud computing environment 40, under a push system. Under a pull system, cloud computing environment 40 (e.g., via processing circuitry 42) may periodically access the interface statistics.

Examples of interface statistics include one or more of information indicative of a number of misses, bit error rate variability, and error correction failure. The number of misses maybe indicative a number of times a network interface device attempted to establish a communication link with a respective OLT but failed due to confirmation of clock recovery. As an example, for ITU PONs, the start of an upstream transmission (e.g., optical signal) includes two parts: a physical layer synchronization block and a payload. The physical layer synchronization block encapsulates a preamble and a delimiter. The preamble is used by the OLT to recover the clock of the upstream transmission. The delimiter is used to confirm proper clock recovery and align the start of burst.

When the clock recovery is successful, the delimiter error rate is at or below an acceptance criteria. In this case, the OLT proceeds to process the payload. If the delimiter is errored at or above an acceptance criteria, the OLT determines that the clock was not correctly recovered and does not process the payload. This is an example of a miss. The presence of misses for a single network device or for multiple network devices may be an indication of rogue behavior on the network (i.e., there is a rogue network device in the network). OLT 12, 52A, and 52N may be configured to track the number of misses that occurred, and processing circuitry 42 in cloud computing environment 40 may receive the number misses as an example of the interface statistics.

Accordingly, if there are many misses in a network with a single network device, then that network device is a rogue network device. In a network with multiple network devices, if there are many misses, there may be rogue network device that is interfering with the physical layer synchronization of many other network devices. However, there may be false alarms if other network issues are causing increases in the bit error rate such as a failing fusion splice. A miss indicates a dropped burst that generates massive latency spikes for the network device.

Another example of the interface statistics is the bit error rate variability in timeslots. As explained, the bit error rate is ratio of a number of errors in a portion of the bitstream relative to a number of bits in the portion of the bitstream, and the bit error rate variability may be indicative of variability in the bit error rates between timeslots. For instance, OLT 12, 52A, or 52N may determine that the bit error rate at particular timeslots is substantially different than bit error rates at other timeslots. That is, one window of bit error rate monitoring may be heavily impacted, the next may not be impacted at all. Such deviation in bit error rate variability may be indicative of presence of a rogue network device, especially if there is deviation from historical trends.

OLT 12, 52A, and 52N may be configured to track the bit error rate variability, and processing circuitry 42 in cloud computing environment 40 may receive the information indicative of the bit error rate variability as an example of the interface statistics. There may be various ways in which OLT 12, 52A, and 52N may determine the bit error rate. For instance, OLT 12, 52A, and 52N may not know ahead of time what the bitstream should be that OLT 12, 52A, or 52N receives. Therefore, it may not be possible for OLT 12, 52A, and 52N to perform a bit-by-bit comparison to determine the bit error rate.

However, there may be certain requirements of the bitstream, represented by the optical signal of optical ones and zeros, to which network devices 28, 58, and 60 conform their respective transmitted optical signals. As one example, a requirement may be a defined duty cycle of the bitstream (e.g., 50% duty cycle). The deviation of the duty cycle of the received bitstream from the defined duty cycle may correlate to the bit error rate. OLT 12, 52A, and 52N may use the duty cycle to determine the bit error rate.

Bit error rate can also be extracted from the packet statistics. Many network devices monitor packet flows and count dropped packets. Dropped packets rates may be indicative of BER when pre/post FEC error statistics are not available. This could be calculated as dropped packets divided by total packets, or as dropped packets rates by packet size, 64 byte to 127 byte packets, 128-255, 256-511, etc.

Another example of interface statistics may be information indicative of error correction failure which includes failure to correct errors in the bitstream. Each of one of network devices 28, 58, and 60 may include an error correction unit that is configured to correct error in the bitstream. Forward error correction (FEC) is a method of enhancing the effective link budget over which an optical connection can operate at or below a desired bit error rate (BER). There are many different types of FEC, such as Reed-Solomon (RS) and Low Density Parity Check (LDPC).

Each FEC type has the ability to correct a raw bitstream from a pre-error correction (before correction) BER level to a post-error correction (after correction) BER level. The pre-error correction BER level refers to the BER of the bitstream that is entering the error correction unit. The post-error correction BER level refers to the BER of the bitstream that the error correction unit outputs. For instance, in OLT 12, 52A, and 52N, there are photodiodes that convert the optical signals into current signals, transimpedance amplifiers that convert the electrical current signals into voltage signals, and additional amplifiers and clock and data recovery circuitry. The BER of the bitstream output from such circuitry may be the pre-error correction BER level, and is fed into the error correction unit. The BER of the bitstream that the error correction unit outputs is the post-error correction BER level. For XGS-PON, it is expected that the error correction unit can correct a $1\times10^{-3}$ BER to $1\times10^{-12}$ BER, which is an improvement of nine orders of magnitude.

For error correction unit to correct for the erroneous bits, one condition may be that the bit errors are uniformly, that is, randomly, distributed throughout the codeword (e.g., bits used for error correction) that the error correction unit is preconfigured to use for error correction. If the errors are not uniformly distributed, the error correction unit may lose its ability to recover the errored bits of the pre-error correction bitstream to the desired post-error correction BER level. The inability of the error correction unit to achieve the desired BER may be referred to as "correction collapse" or "error correction failure."

If the error correction unit fails to correct the erroneous bits to generate a bitstream having the desired BER level (e.g., $1\times10^{-12}$), then it is possible that the errors are not random in nature. If the errors are not random, that means that there is a likely a specific cause for the errors, which may indicate that there is a rogue network device in network 10 or network 50.

In one or more examples, OLT 12, 52A, and 52N may be configured to access the bitstream before the error correction unit to determine the pre-error correction BER, and access the bitstream after the error correction unit to determine the post-error correction BER (e.g., using the techniques described above). OLT 12, 52A, and 52N may determine whether there is error correction failure (e.g., correction collapse) based on the pre-error correction BER and the post-error correction BER. OLT 12, 52A, and 52N may then provide information regarding the error correction failure to processing circuitry 42, as another example of the interface statistic.

Processing circuitry 42 may be configured to use the attribute data (e.g., the interface statistics, and possibly additional data) to identify whether a rogue network device is present in network 10 or network 50. In accordance with one or more examples, one or more memories 44 may store a trained model (e.g., source or object code for the trained model). Processing circuitry 42 may execute the trained model to identify whether a rogue network device is present in the network 10 or network 50, where the attribute data is input to the trained model.

In some examples, the trained model may be based on a series of conditional instructions that compare the interface statistics to threshold values, and processing circuitry 42 may identify whether a rogue network device is present in network 10 or network 50. The threshold values may be based on historical information about how many misses there were, how much the bit error rate variability in timeslots was, or how much there was error correction failure in networks that had rogue network devices.

For instance, the trained model may be programmed with a threshold number of misses. Processing circuitry 42 may access the interface statistics of OLT 12, as an example, including the number of misses in network 10, and which one or ones of network devices 28 had the misses. If processing circuitry 42 determines that the number of misses in network 10 is above a threshold, processing circuitry 42 may identify that there is a rogue network device present in network 10. Processing circuitry 42, by executing the trained model, may perform a voting scheme to determine which one or ones of network devices 28 had the most misses to identify the rogue network device.

As another example, based on the interface statistics of bit error rate variability or the timeslot where there was error correction failure, processing circuitry 42 may determine whether the value of such interface statistics is greater than respective threshold values. If the value of such interface statistics is greater than respective threshold values, processing circuitry 42 may identify that a rogue network device is present.

In some examples, the various interface statistics may be conditional together. For instance, the values of a majority of the interface statistics may need to be greater than respective threshold values for processing circuitry 42 to identify that a rogue network device is present. As another example, the different interface statistics may be weighted differently, such that if an interface statistic that is more reliable at identifying whether a rogue network device is present indicates that a rogue network device is present, processing circuitry 42 may rely on that interface statistic to identify whether a rogue network device is present. For less reliable interface statistics, processing circuitry 42 may determine whether a value of a sufficient number of the interface statistics is greater than respective thresholds, and greater than a sufficient amount before processing circuitry 42 identifies that a rogue network device is present.

Furthermore, in some examples, a topology of the digital twin may be an input to the trained model. For instance, network technology (e.g., GPON, XG-PON), etc.), splitter topology, number of network devices, etc. may all be input into the trained model as further examples of conditions that the trained model uses for identifying whether a rogue network device is present in the network.

The above described some examples of the trained model that processing circuitry 42 may execute to identify whether a rogue network device is present in network 10 or network 50. However, the example techniques are not so limited. In some examples, the trained model may be based on machine learning (ML)/artificial intelligence (AI) techniques.

The following describes example techniques to generate the trained model. In some examples, model generation circuitry may be configured to generate the trained model using ML/AI techniques. Model generation circuitry may be the same as processing circuitry 42, but the example techniques are not so limited. For instance, the model generation circuitry may be part of another computing system, or part of circuitry used by an enterprise to generate the trained model that is then used for rogue network device detection. In general, model generation circuitry may be fixed-function or programmable circuitry.

In one or more examples, the model generation circuitry may be configured to generate the trained model using an ensemble-based machine learning (ML) model, such as a random forest based trained model. For instance, the model generation circuitry may generate the trained model based on an aggregation of a plurality of decision trees used for rogue network device identification for a plurality of different networks.

For instance, network 10 and network 50 are two example networks. In operation, there may be many different networks, and some of these networks may have been determined to have a rogue network device. For instance, as described above, from manual testing, such as evaluating network devices one-by-one, or some other techniques, a network operator may determine that a first network includes a rogue network device. The attribute data from this first network (e.g., first attribute data) may function as training data for generating the trained model. Through manual testing or some other technique, a network operator may determine that a second network includes a rogue network device. The attribute data from this second network (e.g., second attribute data) may function as training data for generating the trained model, and so forth.

There are additional example of training data, such as actual results from in-field use. For example, processing circuitry 42 may execute a first version of the trained model for rogue network device detection. With the first version, there may be some false positives (e.g., rogue network detection, when no rogue is present) or false negatives (e.g., failure to detect a rogue network device), the network operator may flag such false positives and negatives, and the attribute data of networks where there were false positives or false negatives may function as additional training data for model correction (e.g., retraining) and to generate a second version of the trained model. In this manner, it may be possible for the model generation circuitry to iterate on the trained model, and progressively improve the trained model based on in-field use, where the attribute data from the in-field use forms as feedback loop to improve the trained model from the first version to the second version. Such feedback and model correction may be ongoing to generate additional versions of the trained model.

With all of this training data, the model generation circuitry may generate the trained model. For example, in ensemble-based ML model generation, the model generation circuitry may combine multiple models to improve the overall performance and robustness compared to using a single model.

For instance, bagging may be an example of ensemble-based ML model generation. In bagging, the model generation circuitry may train multiple instances of the same model on different subsets of the training data (bootstrap samples) and then average their predictions. In this example, the training data may be data from the different networks, and the predictions may be whether there is a rogue network device.

As another example, boosting may be an example of ensemble-based ML model generation. In boosting, the model generation circuitry may sequentially train models where each subsequent model corrects the errors of its predecessor. As another example, stacking may be an example of ensemble-based ML model generation. In stacking, the model generation circuitry may combine the predictions (e.g., whether there is a rogue network device) of multiple models (base models) as inputs to a higher-level model (meta-model).

There may be additional examples of ensemble-based ML model generation, such as random forest. For purposes of illustration only, and not limitation, the following describes example techniques that the model generation circuitry may utilize to generate the trained model using random forest techniques.

Random forest is an ensemble learning method that generates an output (e.g., prediction) through a combination of decisions made by multiple individual decision trees, each trained on a subset of the attribute data. For instance, each network that is used for training purposes may have a corresponding decision tree. Because each network may have a different attribute data, the training for the generation of the trained model may be based on a subset of attribute data.

For the training phase, model generation circuitry may be configured to perform bootstrapped sampling. For instance, the model generation circuitry may start by creating multiple decision trees. As an example, the model generation circuitry may determine a plurality of decision trees, where each decision tree is associated with a corresponding network whose attribute data, including interface statistics, is used for training a trained model and includes one or more decision nodes for indicating whether the corresponding network includes a rogue network device.

Each tree is trained on a different bootstrap sample. That is, the model generation circuitry may utilize the attribute data of a particular network, and use that attribute data, including its interface statistics, for training a decision tree for that particular network for identifying whether that particular network has a rogue network device. For instance, there may be many networks with similar configurations, topologies, network technologies, etc. These networks may together form a class of networks. Some of these networks may have rogue network devices, and some may not. The model generation circuitry may utilize the attribute data, including interface statistics, to determine a decision tree for that class of networks. There may be multiple different classes of networks (e.g., different configurations, topologies, network technologies, etc.), and the model generation circuitry may determine decision trees for these classes of networks.

For instance, each of the decision trees may include decision nodes (e.g., points where the decision tree branches), and is generally an affirmative or negative determination (e.g., decision node is true or false), but the techniques are not so limited. The model generation circuitry may determine the nodes and the depth of the decision tree for the corresponding networks to determine a decision tree for that network that is usable for identifying whether a rogue network device is present in that network.

For example, at each node of each decision tree, the model generation circuitry may consider only a subset of attribute data for splitting. This introduces randomness and helps to decorrelate the trees. The model generation circuitry may grow each decision tree to a certain depth or until no further splits can be made that significantly improve the ability of a decision tree to determine whether a rogue network device is present.

The model generation circuitry may aggregate the plurality of decision trees to generate the trained model. That is, the model generation circuitry may generate a larger tree by aggregating the plurality of decision trees. This larger tree may be extensible and applicable to any network. For instance, by generating the trained model with aggregating the plurality of decision trees, the trained model may accurately determine whether a network includes a rogue network device, and minimize changes of false positives. Stated yet another way, the trained model may be trained with a diversity of training data from networks with a diversity of topologies, technologies, etc. Therefore, the trained model may be well suited for predicting whether a network includes a rogue network device.

The model generation circuitry may then output the trained model. For example, one or more memories 44 may store the trained model. Processing circuitry 42 may utilize the trained model to identify whether a rogue network device is present in the network 10 or network 50. The attribute data of network 10 or network 50 may be input to the trained model.

As described above, model generation circuitry may determine a plurality of decision trees, where each decision tree is associated with a corresponding network whose attribute data, including interface statistics, is used for training a trained model and includes one or more decision nodes for indicating whether the corresponding network includes a rogue network device. The above describes some example ways in which the model generation circuitry may determine the plurality of decision trees. However, the example techniques are not so limited.

In some examples, OLT 12, 52A, and 52N may be configured to determine the plurality of decision trees using techniques described above. In such examples, OLT 12, 52A, and 52N may transmit the decision trees to the model generation circuitry. Stated another way, to determine the plurality of decision trees, the model generation circuitry may be configured to receive one or more decision trees from each OLT of each corresponding network. There may be other ways in which the model generation circuitry may determine the plurality of decision trees, and the above are provided for example purposes only.

Figure 3B:
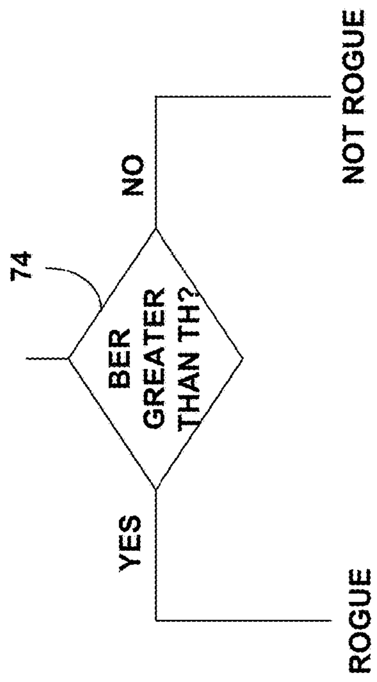
FIGS. 3A-3C are decision trees illustrating an example of rogue network device detection.
Figure 3A:
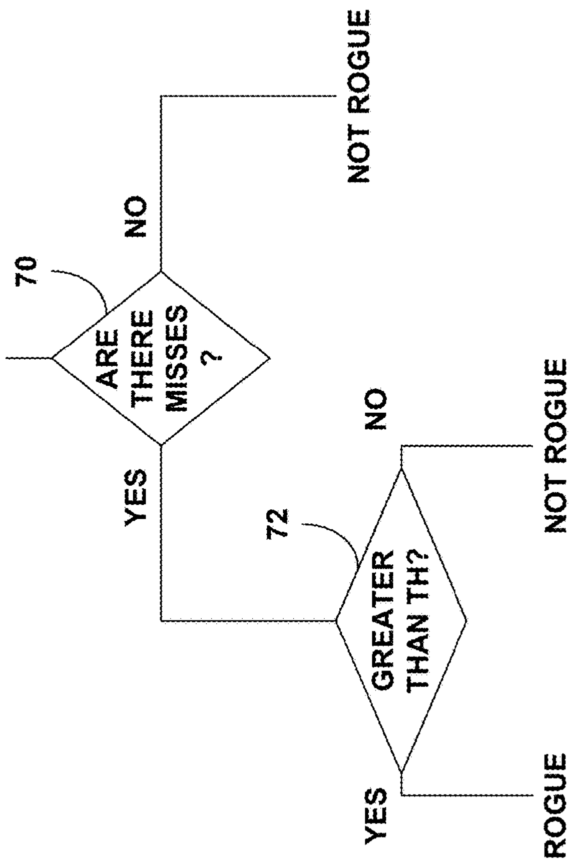
Figure 3C:
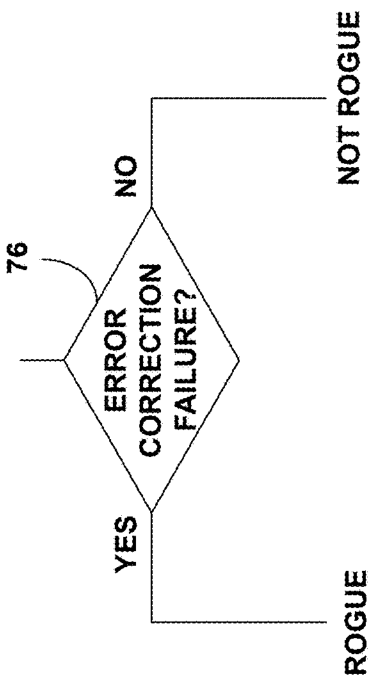

FIGS. 3A-3C are decision trees illustrating an example of rogue network device detection. The decision trees in FIGS. 3A-3C are illustrated to assist with understanding. The decision trees may be more complex and involved than those illustrated in FIGS. 3A-3C. As described, each decision tree may be associated with a corresponding network whose attribute data, including interface statistics, is used for training a trained model and includes one or more decision nodes for indicating whether the corresponding network includes a rogue network device.

The decision tree of FIG. 3A includes node 70 for whether there are misses in the network for FIG. 3A. As described above, the number of misses is one example of the interface statistics. If there are no misses, there may not be a rogue network device in the network for FIG. 3A. If there are misses, then at node 72, a decision may be whether the number of misses is greater than a threshold. If yes, then there is a rogue network device. If no, there is not a rogue network device. In one or more examples, the model generation circuitry may determine what should be nodes 70 and 72, and what should be the threshold based on the attribute data for networks where rogue network devices were present and networks where rogue network devices were not present.

The decision tree of FIG. 3B includes node 74 for whether the bit error rate variability in timeslots is greater than a threshold. As described above, bit error rate variability in timeslots is one example of the interface statistics. If the bit error rate variability in timeslots is less than threshold, then there is no rogue network device. If the bit error rate variability in timeslots is greater than threshold, then there is a rogue network device. In one or more examples, the model generation circuitry may determine what should be node 74, and what should be the threshold based on the attribute data for networks where rogue network devices were present and networks where rogue network devices were not present.

The decision tree of FIG. 3C includes node 76 for whether there is error correction failure in one or more timeslots. As described above, error correction failure is one example of the interface statistics. If the error correction failure is less than threshold, then there is no rogue network device. If the error correction failure is greater than threshold, then there is a rogue network device. In one or more examples, the model generation circuitry may determine what should be node 76, and what should be the threshold based on the attribute data for networks where rogue network devices were present and networks where rogue network devices were not present.

FIG. 4 is a block diagram illustrating another example network, in accordance with one or more aspects of this disclosure. FIG. 4 illustrates an example of a transport network 80. Transport network 80 may be a part of a wide area network (WAN), such as the Internet. There may be various examples of transport network 80, such as a ring network, spline network, or a mesh network, as a few non-limiting examples. The examples described above are described with respect to a PON, but the techniques are not so limited. The example techniques for rogue network device detection may be applicable to transport networks. For instance, the network devices that can become rogue in transport networks may be the hubs and/or nodes of the transport network.

Transport network 80 may include one or more hubs (e.g., network hub 82) and one or more nodes (e.g., nodes 84A-84N). Nodes 84A-84N may be a specific point in transport network 80 where data is either originated, terminated, or passed through. Nodes 84A-84N may serve as a junction where different paths or connections come together. Nodes 84A-84N may be configured to perform various functions, such as routing and switching of optical signals, amplification of signals to boost signal strength over long distances, and managing network traffic. Examples of nodes 84A-84N include optical switches, multiplexers, and demultiplexers.

Network hub 82 may be a central or key node in transport network 80 where multiple optical fibers converge or interconnect. Network hub 82 may function as a major junction for the aggregation, distribution, and routing of optical signals. For example, network hub 82 may manage and route data from multiple sources and destinations. Network hub 82 may serve as central points for signal distribution, allowing for efficient data handling and network management. Network hub 82 may physical locations or facilities, such as data centers or central offices, that house network equipment, and may include high-capacity equipment for switching and multiplexing multiple optical channels.

For instance, transport network 80 may be a dense wavelength-division multiplexing (DWDM) network. For example, there may be multiple different fiber optic links that connect each of nodes 84A-84N and network hub 82, where each fiber optic links carries optical signal having different wavelengths. In some examples, there may be twenty fiber optic links that interconnect node 84A to node 84B.

Transport network 80 may be a ring network, as illustrated in FIG. 4. A ring network may be a type of network topology where each node (e.g., nodes 84A-84N) is connected to exactly two other nodes or network hub 82, forming a circular data path.

In a ring network, optical signals travel in one direction (in a unidirectional ring) or in both directions (in a bidirectional ring). For ease, in a ring network, the nodes or hub that a node is connected are identified using directions. For instance, in FIG. 4, node 84B is network west of node 84A, and network hub 82 is network east of node 84A.

In a unidirectional ring, node 84A may only be able to transmit optical signals in one direction (e.g., either east or west), and receive optical signals from the other direction. In a bidirectional ring, node 84A may transmit optical signals in either direction, and receive optical signals from either direction, which adds redundancy and fault tolerance.

In the example of FIG. 4, nodes 84A-84N may be configured to transmit and receive bidirectionally (e.g., transport network 80 is a bidirectional ring). For example, node 84A includes WDM 86A that transmits optical signals in the network west direction (e.g., to node 84B), and includes WDM 86B that receives optical signals from the network east direction (e.g., from network hub 82). Node 84A also includes WDM 86C that receives optical signals from the network west direction (e.g., from node 84B), and includes WDM 86D that transmits optical signals in the network east direction (e.g., to network hub 82).

Within node 84A, WDM 86A and WDM 86B may include bypass links (e.g., bypass west) such that optical signals not intended for node 84A but coming from network hub 82 pass through node 84A towards node 84B. Similarly, WDM 86C and WDM 86D may include bypass links (e.g., bypass east) such that optical signals not intended for node 84A but coming from node 84B pass through node 84A towards network hub 82.

For example, node 84A may be configured to receive optical signals having a first set of wavelengths and transmit optical signals having a second set of wavelengths. If an optical signal that is received by WDM 86B is not in the first set of wavelengths, or an optical signal that is received by WDM 86C is not in the first set of wavelengths, then such optical signals may pass through node 84A.

If an optical signal having a wavelength within the first set of wavelengths is received by WDM 86B or WDM 86C, then WDM 86B or WDM 86C may route such optical signals to components within node 84A, illustrated as drop east to receivers "R" and drop west to receivers "R" in FIG. 4. Node 84A may then transmit those signals to other components. For instance, node 84A may be an OLT, and may receive optical signals from WDM 86B or WDM 86C. The OLT may then process the optical signals and generate another set of optical signals or pass those optical signals to subscriber devices. For instance, WDM 86B or WDM 86C may include the PSTN, ISP, or video content (e.g., of FIG. 1), and node 84A may transmit that data to subscriber devices, such as those of FIG. 1.

Also, components within node 84A may generate optical signals having a wavelength within the second set of wavelengths that WDM 86A or WDM 86D transmit, as illustrated by add west through transmitters "T" and add east through transmitters "T" in FIG. 4. The optical signals may include the data generated by subscriber devices. For example, WDM 86A and WDM 86D may transmit data received from subscriber devices, such as those of FIG. 1.

Node 84A being an OLT is one example, and should not be considered limiting. Also, nodes 84A-84N, and possibly network hub 82, may include similar components as illustrated for node 84A.

As described, transport network 80 may be a spline network or a mesh network as additional examples. Other network topologies are possible as well for DWDM networks.

A spline network may be a type of network where nodes are connected in a non-linear, often flexible arrangement that allows for multiple paths between nodes. For example, a spline network may include a leaf-and-node topology, where a plurality of nodes communicate with a hub, and the hub routes communication between the nodes. A hub may also communicate with another hub, where this other hub includes its own nodes. In a spline network, data can travel from a first node to a first hub, from the first hub to a second hub, and from the second hub to a second node connected to the second hub. A spline network may also support DWDM, and may include WDMs similar to those illustrated in FIG. 4.

A mesh network is a topology where each node is connected to multiple other nodes, creating a web-like structure. Examples of a mesh network include a full mesh and a partial mesh. In a full mesh, every node is directly connected to every other node. This provides the highest level of redundancy and fault tolerance since there are multiple paths for data to travel. In a partial mesh, only some nodes are directly connected, while others are connected through intermediate nodes. This offers a balance between redundancy and cost.

In different examples of transport networks, such a transport network 80, the hub (e.g., network hub 82) or nodes (e.g., nodes 84A-84N) may support multiple different wavelengths, and may route these optical signals with different wavelengths. One example way in which to perform such routing of optical signals within a node is through tunable optics.

However, if the tunable optics are not functioning correctly or are instructed to tune to an incorrect wavelength, the optical signals may start to interfere with one another. For instance, since the wavelengths of the optical signals are different, there should be no interference. In a case where the wavelength of an optical signal is being transmitted on a different wavelength then intended (e.g., due to errors in the tunable optics or instructions to the tunable optics), there may be interference, which cause the rogue behavior described above.

Accordingly, in one or more examples, it may be possible for one or more of nodes 84A-84N or network hub 82 to become rogue in a ring network, or other examples of transport networks. That is, the various examples described above-described ONUs as examples of network devices that may become a rogue network device. In some examples, nodes 84A-84N or hub 82 may be another example of a network device that can become rogue.

For example, although cloud computing environment 40 is not shown in FIG. 4, in some examples, processing circuitry 42 of cloud computing environment 40 may be configured to receive attribute data of a network (e.g., transport network 80). The attribute data may include interface statistics between a plurality of network devices (e.g., nodes 84A-84N and/or network hub 82) in the network (e.g., transport network 80). Network hub 82 or one or more of nodes 84A-84N may be configured to transmit the attribute data to cloud computing environment 40.

Processing circuitry 42 may execute a trained model to identify whether a rogue network device is present in the network (e.g., whether one of nodes 84A-84N or network 82 is rogue). As described, the attribute data is input to the trained model. Processing circuitry 42 may output, from the execution of the trained model, information indicative of whether the rogue network device is present in the network. That is, processing circuitry 42 may output information indicative of whether a rogue node 84A-84N or network hub 82 is present in transport network 80, examples of which include a ring network, spline network, or mesh network.

Figure 5:
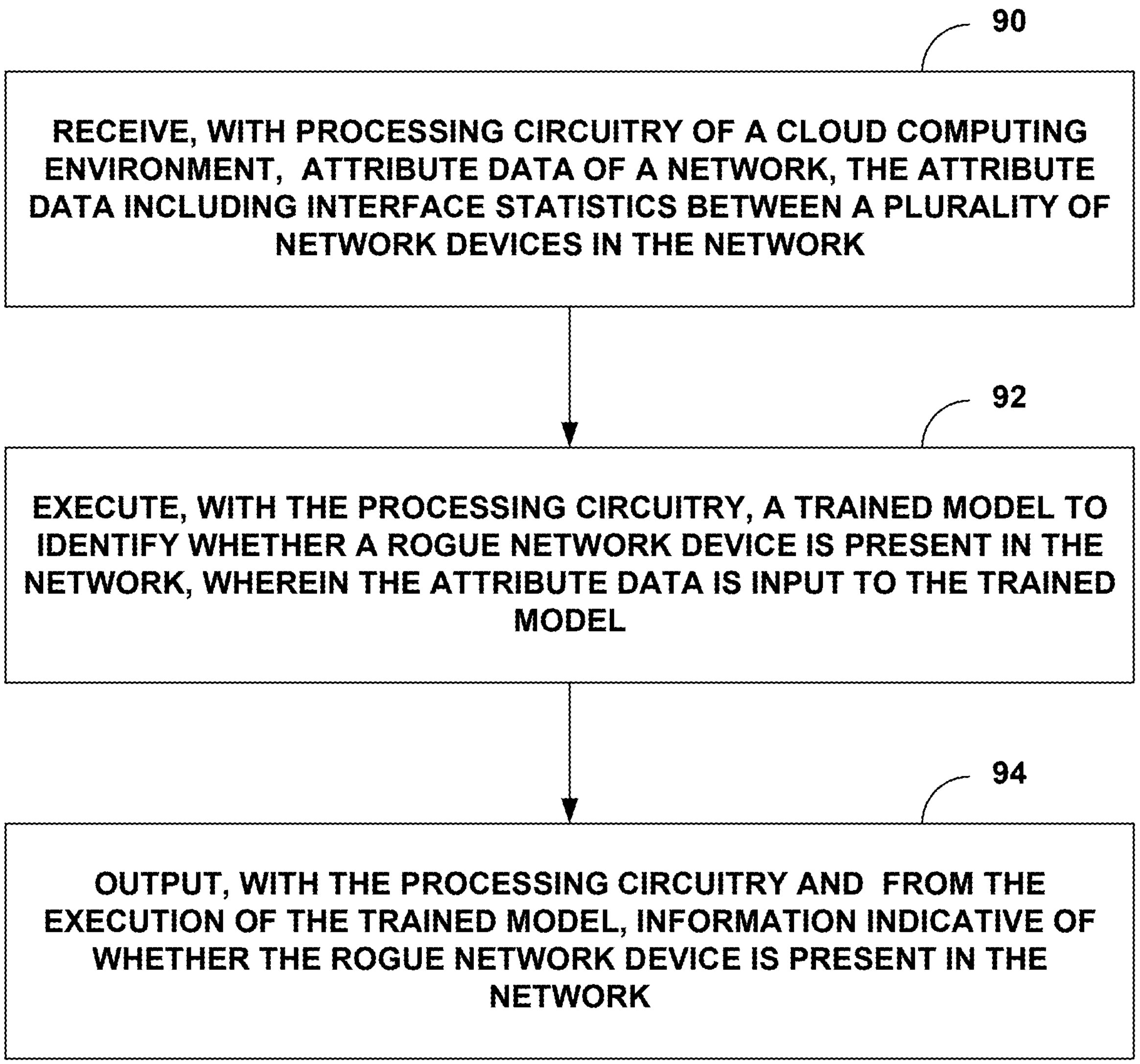
FIG. 5 is a flowchart illustrating an example method of operation for rogue network device detection in accordance with techniques described in this disclosure.

FIG. 5 is a flowchart illustrating an example method of operation for rogue network device detection in accordance with techniques described in this disclosure. Processing circuitry 42 of cloud computing environment 40 (e.g., processing circuitry of the one or more servers that form cloud computing environment 40) may receive attribute data of a network, the attribute data including interface statistics between a plurality of network devices in the network (90).

In one or more examples, the network is a passive optical network (PON), and the plurality of network devices are ONUs configured to communicate with an OLT. In some examples, the network is a transport network (e.g., transport network 80) comprising one or more of a plurality of nodes and hubs (e.g., network hub 82 or nodes 84A-84N). The plurality of network devices may one or both of the plurality of nodes and hubs. The transport network may be one of a ring network, spline network, or mesh network.

As an example, the OLT of the network may be configured to gather the interface statistics, and transmit the interface statistics to processing circuitry 42. As another example, a hub (e.g., network hub 82) or a node (e.g., one of nodes 84A-84N) of the network (e.g., transport network 80) may be configured to gather the interface statistics, and transmit the interface statistics to processing circuitry 42.

In one or more examples, the interface statistics include one or more of information indicative of a number of misses, bit error rate variability in timeslots, and error correction failure. The number of misses may include a number of times that network devices of the plurality of network devices failed to establish a communication link. The bit error rate is ratio of a number of errors in a portion of the bitstream relative to a number of bits in the portion of the bitstream, and the bit error rate variability is indicative of variability in the bit error rates between timeslots. The error correction failure includes failure to correct errors in the bitstream. In some examples, the attribute data, in addition to the interface statistics, includes one or more of network technology, splitter topology, and number of network devices. Furthermore, processing circuitry 42 may be configured to generate a digital twin of the network based on the interface statistics, and a topology of the digital twin may be an input to the trained model.

Processing circuitry 42 may execute a trained model to identify whether a rogue network device is present in the network, where the attribute data is input to the trained model (92). For example, one or more memories 44 may store the source code or the object code of the trained model. The trained model may be a set of conditional instructions, or may be more complicated and based on ML/AI techniques.

For example, the trained model may be an ensemble-based machine learning (ML) model. The trained model may be a random forest based trained model. In some examples, the trained model is based on an aggregation of a plurality of decision trees used for rogue network device identification for a plurality of different networks.

Processing circuitry 42 may output, from the execution of the trained model, information indicative of whether the rogue network device is present in the network (94). For instance, a network operator may then take corrective action to address issues with the rogue network device. In some examples, the output of the trained model may also be information indicative of which network device is the rogue network device, such as based on a voting scheme of which rogue network device had the most misses, corresponded to the most bit error rate variability, or the most error correction failures. The network operator may then disable that network device.

Figure 6:
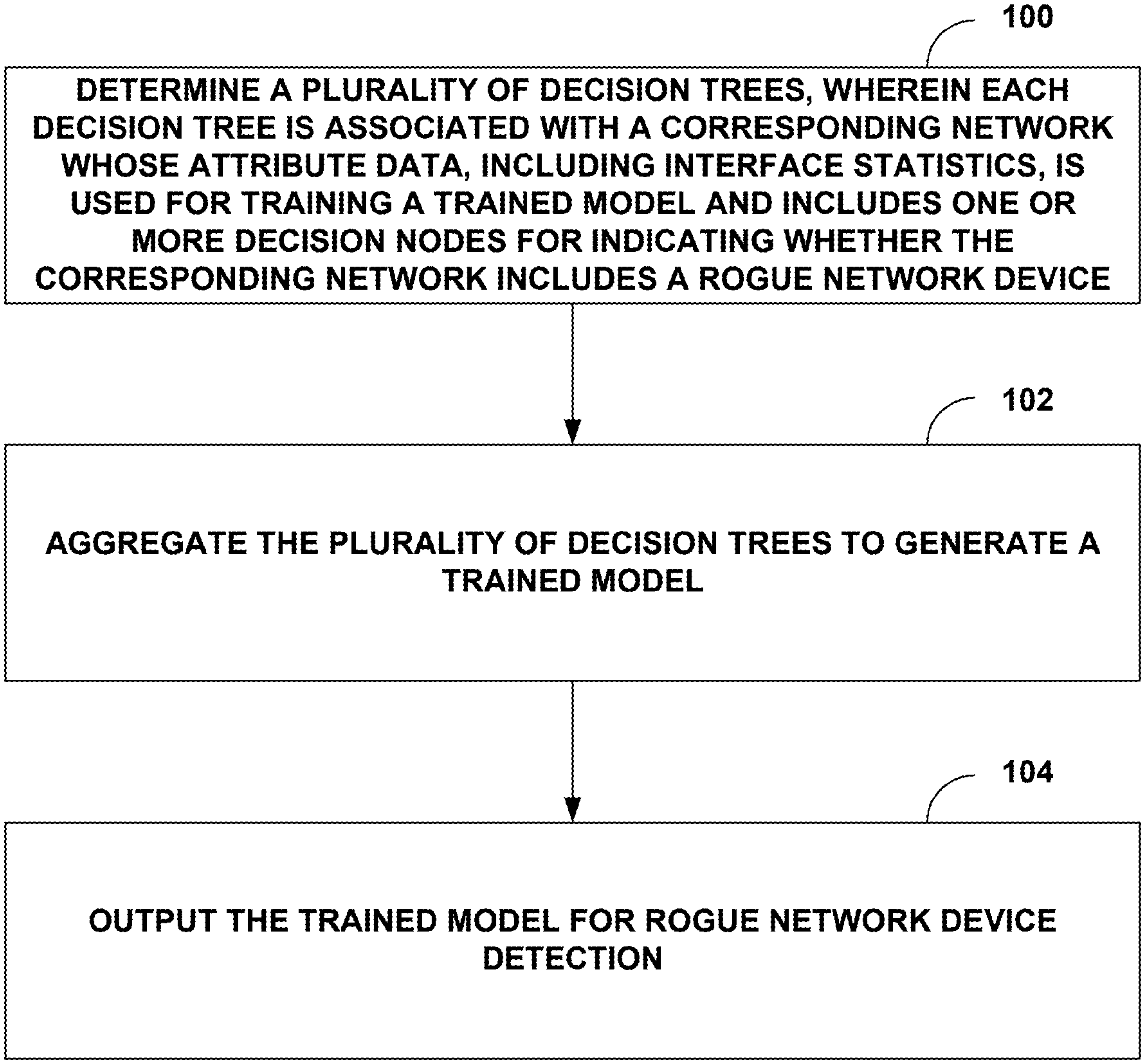
FIG. 6 is a flowchart illustrating an example method of operation for generating a trained model for rogue network device detection in accordance with techniques described in this disclosure.

FIG. 6 is a flowchart illustrating an example method of operation for generating a trained model for rogue network device detection in accordance with techniques described in this disclosure. The example techniques of FIG. 6 are described with respect to model generation circuitry, which may be the same as processing circuitry 42 or may be other circuitry, such as in a server dedicated for generating the trained model.

The model generation circuitry may determine a plurality of decision trees, where each decision tree is associated with a corresponding network whose attribute data, including interface statistics, is used for training a trained model and includes one or more decision nodes for indicating whether the corresponding network includes a rogue network device (100). For instance, to determine the plurality of decision trees, the model generation circuitry may be configured to receive the attribute data of each corresponding network (e.g., from the respective OLT of the corresponding network or a respective hub or node of the corresponding network). As another example, to determine the plurality of decision trees, the model generation circuitry may be configured to receive one or more decision trees from each OLT of each corresponding network or from a hub or node of each corresponding network.

The model generation circuitry may be configured to aggregate the plurality of decision trees to generate a trained model (102). For instance, the model generation circuitry may utilize random forest techniques to aggregate the plurality of decision trees to generate the trained model. This way, the trained model may be extensible for multiple different types of networks.

The model generation circuitry may output the trained model for rogue network device detection (104). For example, one or more memories 44 may store the source code or object code of the trained model. Processing circuitry 42 may execute the trained model to identify whether a rogue network device is present in a network.

The following examples may be performed separately or in combination.

Example 1. A system comprising: one or more memories; and a cloud computing environment comprising processing circuitry coupled to the one or more memories, wherein the processing circuitry is configured to: receive attribute data of a network, the attribute data including interface statistics between a plurality of network devices in the network; execute a trained model to identify whether a rogue network device is present in the network, wherein the attribute data is input to the trained model; and output, from the execution of the trained model, information indicative of whether the rogue network device is present in the network.

Example 2. The system of example 1, further comprising an optical line terminal (OLT), wherein the network is a passive optical network (PON), wherein the plurality of network devices are optical network units (ONUs) configured to communicate with the OLT.

Example 3. The system of example 1, wherein the network is a transport network comprising one or more of a plurality of nodes and hubs, and wherein the plurality of network devices are one or both of the plurality of nodes and hubs.

Example 4. The system of example 3, wherein the transport network is one of a ring network, spline network, or mesh network.

Example 5. The system of any of examples 1-4, wherein the rogue network device comprises one of: a first network device that fails to transmit or transmits optical signals having optical power that is out of range; a second network device that transmits optical signals outside of a provisioned timeslot; or a third network device that transmits optical signals outside of a spectral allocation.

Example 6. The system of any of examples 1-5, wherein the interface statistics include one or more of information indicative of a number of misses, bit error rate variability in timeslots, and error correction failure, wherein the number of misses includes a number of times that network devices of the plurality of network devices failed to establish a communication link, wherein a bit error rate is ratio of a number of errors in a portion of a bitstream relative to a number of bits in the portion of the bitstream, and the bit error rate variability is indicative of variability in bit error rates between timeslots, and wherein the error correction failure includes failure to correct errors in the bitstream.

Example 7. The system of any of examples 1-6, wherein the attribute data, in addition to the interface statistics, includes one or more of network technology, splitter topology, and number of network devices.

Example 8. The system of any of examples 1-7, wherein the trained model comprises an ensemble-based machine learning (ML) model.

Example 9. The system of any of examples 1-8, wherein the trained model comprises a random forest based trained model.

Example 10. The system of any of examples 1-9, wherein the trained model is based on an aggregation of a plurality of decision trees used for rogue network device identification for a plurality of different networks.

Example 11. The system of any of examples 1-10, wherein the processing circuitry is configured to generate a digital twin of the network based on the interface statistics, and wherein a topology of the digital twin is an input to the trained model.

Example 12. The system of any of examples 1-11, wherein an optical line terminal (OLT) or a hub or node of the network is configured to: gather the interface statistics; and transmit the interface statistics to the processing circuitry.

Example 13. A method of performing, one or more computer-readable storage media storing instructions that cause one or more processors to perform, or means for performing the example techniques of any one or combination of examples 1-12.

Example 14. A system comprising: one or more memories; and model generation circuitry coupled to the one or more memories, wherein the model generation circuitry is configured to: determine a plurality of decision trees, wherein each decision tree is associated with a corresponding network whose attribute data, including interface statistics, is used for training a trained model and includes one or more decision nodes for indicating whether the corresponding network includes a rogue network device; aggregate the plurality of decision trees to generate the trained model; and output the trained model for rogue network device detection.

Example 15. The system of example 14, wherein each corresponding network is a passive optical network (PON) and includes at least one optical line terminal (OLT) and one or more optical network units (ONUs) that communicate with the OLT.

Example 16. The system of example 14, wherein each corresponding network is a transport network and includes one or more of a plurality of hubs and a plurality of nodes.

Example 17. The system of example 16, wherein the transport network is one of a ring network, spline network, or mesh network.

Example 18. The system of any of examples 14-17, wherein the rogue network device comprises one of: a first network device that fails to transmit or transmits optical signals having optical power that is out of range; a second network device that transmits optical signals outside of a provisioned timeslot; or a third network device that transmits optical signals outside of a spectral allocation.

Example 19. The system of any of examples 14-18, wherein to determine the plurality of decision trees, the model generation circuitry is configured to receive the attribute data of each corresponding network.

Example 20. The system of any of examples 14-19, wherein the attribute data, in addition to the interface statistics, includes one or more of network technology of each corresponding network, splitter topology of each corresponding network, and number of network devices of each corresponding network.

Example 21. The system of any of examples 14-20, wherein the trained model comprises an ensemble-based machine learning (ML) model.

Example 22. The system of any of examples 14-21, wherein the trained model comprises a random forest based trained model.

Example 23. The system of any of examples 14-22, wherein to determine the plurality of decision trees, the model generation circuitry is configured to receive one or more decision trees from each optical line terminal (OLT), hub, or node of each corresponding network.

Example 24. The system of any of examples 14-23, wherein the interface statistics include one or more of information indicative of a number of misses, bit error rate variability in timeslots, and error correction failure, wherein the number of misses includes a number of times that network devices failed to establish a communication link, wherein the bit error rate is ratio of a number of errors in a portion of the bitstream relative to a number of bits in the portion of the bitstream, and the bit error rate variability is indicative of variability in the bit error rates between timeslots, and wherein the error correction failure includes failure to correct errors in the bitstream.

Example 25. A method of performing, one or more computer-readable storage media storing instructions that cause one or more processors to perform, or means for performing the example techniques of any one or combination of examples 14-24.

Example 26. A system for performing, a method of performing, one or more computer-readable storage media storing instructions that cause one or more processors to perform, or means for performing the example techniques of any one or combination of examples 1-25.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors (e.g., processing circuitry 42), such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "controller" as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A system comprising:

one or more memories; and model generation circuitry coupled to the one or more memories, wherein the model generation circuitry is configured to:

determine a plurality of decision trees, wherein each decision tree is associated with a corresponding network whose attribute data, including interface statistics, is used for training a trained model and includes one or more decision nodes for indicating whether the corresponding network includes a rogue network device;

aggregate the plurality of decision trees to generate the trained model; and output the trained model for rogue network device detection.

2. The system of claim 1, wherein each corresponding network is a passive optical network (PON) and includes at least one optical line terminal (OLT) and one or more optical network units (ONUs) that communicate with the OLT.

3. The system of claim 1, wherein each corresponding network is a transport network and includes one or more of a plurality of hubs and a plurality of nodes.

4. The system of claim 3, wherein the transport network is one of a ring network, spline network, or mesh network.

5. The system of claim 1, wherein the rogue network device comprises one of:

a first network device that fails to transmit or transmits optical signals having optical power that is out of range;

a second network device that transmits optical signals outside of a provisioned timeslot; or a third network device that transmits optical signals outside of a spectral allocation.

6. The system of claim 1, wherein to determine the plurality of decision trees, the model generation circuitry is configured to receive the attribute data of each corresponding network.

7. The system of claim 1, wherein the attribute data, in addition to the interface statistics, includes one or more of network technology of each corresponding network, splitter topology of each corresponding network, and number of network devices of each corresponding network.

8. The system of claim 1, wherein the trained model comprises an ensemble-based machine learning (ML) model.

9. The system of claim 1, wherein the trained model comprises a random forest based trained model.

10. The system of claim 1, wherein to determine the plurality of decision trees, the model generation circuitry is configured to receive one or more decision trees from each optical line terminal (OLT), hub, or node of each corresponding network.

11. The system of claim 1, wherein the interface statistics include one or more of information indicative of a number of misses, bit error rate variability in timeslots, and error correction failure, wherein the number of misses includes a number of times that network devices failed to establish a communication link, wherein a bit error rate is a ratio of a number of errors in a portion of the bitstream relative to a number of bits in the portion of the bitstream, and the bit error rate variability is indicative of variability in the bit error rate between timeslots, and wherein the error correction failure includes failure to correct errors in the bitstream.

12. A method comprising:

determining, with model generation circuitry, a plurality of decision trees, wherein each decision tree is associated with a corresponding network whose attribute data, including interface statistics, is used for training a trained model and includes one or more decision nodes for indicating whether the corresponding network includes a rogue network device;

aggregating the plurality of decision trees to generate a trained model; and outputting the trained model for rogue network device detection.

13. The method of claim 12, wherein each corresponding network is a passive optical network (PON) and includes at least one optical line terminal (OLT) and one or more optical network units (ONUs) that communicate with the OLT.

14. The method of claim 12, wherein each corresponding network is a transport network and includes one or more of a plurality of hubs and a plurality of nodes.

15. The method of claim 14, wherein the transport network is one of a ring network, spline network, or mesh network.

16. The method of claim 12, wherein the rogue network device comprises one of:

a first network device that fails to transmit or transmits optical signals having optical power that is out of range;

a second network device that transmits optical signals outside of a provisioned timeslot; or a third network device that transmits optical signals outside of a spectral allocation.

17. The method of claim 12, wherein determining the plurality of decision trees comprises receiving the attribute data of each corresponding network.

18. The method of claim 12, wherein the attribute data, in addition to the interface statistics, includes one or more of network technology of each corresponding network, splitter topology of each corresponding network, and number of network devices of each corresponding network.

19. The method of claim 12, wherein the interface statistics include one or more of information indicative of a number of misses, bit error rate variability in timeslots, and error correction failure, wherein the number of misses includes a number of times that network devices failed to establish a communication link, wherein a bit error rate is a ratio of a number of errors in a portion of the bitstream relative to a number of bits in the portion of the bitstream, and the bit error rate variability is indicative of variability in the bit error rate between timeslots, and wherein the error correction failure includes failure to correct errors in the bitstream.

20. A computer-readable storage medium storing instructions thereon that when executed cause model generation circuitry to:

determine a plurality of decision trees, wherein each decision tree is associated with a corresponding network whose attribute data, including interface statistics, is used for training a trained model and includes one or more decision nodes for indicating whether the corresponding network includes a rogue network device;

aggregate the plurality of decision trees to generate a trained model; and output the trained model for rogue network device detection.

* * * * *